United States Patent
Wu et al.

(10) Patent No.: US 12,490,797 B2
(45) Date of Patent: Dec. 9, 2025

(54) SPORTS SHOE

(71) Applicant: INDUSTRIAL TECHNOLOGY RESEARCH INSTITUTE, Hsinchu (TW)

(72) Inventors: Jin-An Wu, Hsinchu (TW); Che-Tseng Lin, Changhua (TW); Chien-Ming Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 79 days.

(21) Appl. No.: 18/454,600

(22) Filed: Aug. 23, 2023

(65) Prior Publication Data

US 2024/0065367 A1   Feb. 29, 2024

Related U.S. Application Data

(60) Provisional application No. 63/400,129, filed on Aug. 23, 2022.

(30) Foreign Application Priority Data

Jul. 19, 2023 (TW) ................. 112126852

(51) Int. Cl.
*A43B 1/10* (2006.01)
*A43B 1/028* (2022.01)
(Continued)

(52) U.S. Cl.
CPC ............. *A43B 1/10* (2013.01); *A43B 1/028* (2022.01); *A43B 5/00* (2013.01); *A43B 7/142* (2013.01); *A43B 13/04* (2013.01); *A43B 13/187* (2013.01)

(58) Field of Classification Search
None
See application file for complete search history.

(56) References Cited

U.S. PATENT DOCUMENTS 2,437,030 A * 3/1948 Hoza ..................... A43B 9/00
                                                      12/142 RS
2,858,571 A * 11/1958 Dunbar ................ A43B 13/04
                                                      264/48
(Continued)

FOREIGN PATENT DOCUMENTS

CN      104363782 A      2/2015
CN      107447291 A      12/2017
(Continued)

OTHER PUBLICATIONS

English machine translation of CN 110713640 A. Via Clarivate Analytics performed on PE2E Search. Translation performed on Apr. 24, 2025. (Year: 2020).*

(Continued)

*Primary Examiner* — Jameson D Collier
(74) *Attorney, Agent, or Firm* — Birch, Stewart, Kolasch & Birch, LLP

(57) ABSTRACT

A sports shoe is provided. The sports shoe includes a shoe vamp and a shoe sole connected to the shoe vamp. The shoe vamp includes a textile component, wherein the textile component includes thermoplastic polyester fibers. The shoe sole includes a shoe outsole and a shoe midsole foam disposed between the shoe outsole and the shoe vamp, wherein the shoe outsole includes a vulcanizate and the shoe midsole foam includes a first thermoplastic elastomer. The vulcanizate includes rubber particles, a second thermoplastic elastomer, and an interface-compatible resin, wherein the content of the rubber particles is greater than the content of the second thermoplastic elastomer. The rubber particles are (Continued)

dispersed in the second thermoplastic elastomer in the form of spherical particles with particle sizes of about 0.5-10 μm.

15 Claims, 1 Drawing Sheet

(51) Int. Cl.
*A43B 5/00* (2022.01)
*A43B 7/142* (2022.01)
*A43B 13/04* (2006.01)
*A43B 13/18* (2006.01)

(56) References Cited

U.S. PATENT DOCUMENTS

| | | | | |
|---|---|---|---|---|
| 5,396,675 | A * | 3/1995 | Vincent | B29D 35/122 36/114 |
| 5,932,336 | A * | 8/1999 | Allen | A43B 13/026 428/313.5 |
| 6,184,296 | B1 * | 2/2001 | Obrecht | C08L 21/00 525/232 |
| 6,632,888 | B2 * | 10/2003 | Obrecht | C08K 5/5465 525/215 |
| 2003/0022575 | A1 * | 1/2003 | Yoneda | D06N 3/14 442/104 |
| 2010/0263240 | A1 * | 10/2010 | Shelton | A43B 1/0063 12/146 BR |
| 2012/0233883 | A1 | 9/2012 | Spencer et al. | |
| 2013/0104423 | A1 * | 5/2013 | Hatfield | A43B 23/0235 36/103 |
| 2013/0280456 | A1 * | 10/2013 | Obrecht | C08L 21/00 428/36.4 |
| 2014/0066530 | A1 | 3/2014 | Shen et al. | |
| 2014/0197253 | A1 | 7/2014 | Lofts et al. | |
| 2016/0302508 | A1 * | 10/2016 | Kormann | G06Q 99/00 |
| 2017/0215522 | A1 | 8/2017 | Tateishi et al. | |
| 2018/0289104 | A1 * | 10/2018 | Huh | A43B 13/32 |
| 2019/0231024 | A1 * | 8/2019 | Smith | A43C 15/161 |
| 2019/0380431 | A1 * | 12/2019 | Sakamoto | C08K 5/548 |
| 2020/0297062 | A1 * | 9/2020 | Sawada | C08L 21/00 |
| 2021/0079186 | A1 * | 3/2021 | Baghdadi | B32B 7/12 |
| 2021/0079188 | A1 * | 3/2021 | Baghdadi | A43B 13/26 |
| 2021/0277199 | A1 * | 9/2021 | Archer | B29D 35/061 |
| 2021/0401106 | A1 * | 12/2021 | Thompsett | A43B 23/0255 |
| 2022/0403146 | A1 * | 12/2022 | Hung | B29B 17/0412 |

FOREIGN PATENT DOCUMENTS

| | | | | |
|---|---|---|---|---|
| CN | 110713640 | A * | 1/2020 | A43B 13/04 |
| CN | 111150173 | A | 5/2020 | |
| CN | 111227428 | A | 6/2020 | |
| CN | 112020534 | A | 12/2020 | |
| CN | 114209123 | A | 3/2022 | |
| CN | 114375167 | A | 4/2022 | |
| CN | 114698897 | A | 7/2022 | |
| DE | 20 2012 005 735 | U1 | 8/2012 | |
| DE | 10 2015 206 900 | A1 | 10/2016 | |
| TW | M579907 | U | 7/2019 | |
| TW | 201938633 | A | 10/2019 | |
| TW | M617811 | U | 10/2021 | |
| TW | M624144 | U | 3/2022 | |

OTHER PUBLICATIONS

Taiwanese Office Action and Search Report for Taiwanese Application No. 112126852, dated Sep. 5, 2023.

* cited by examiner

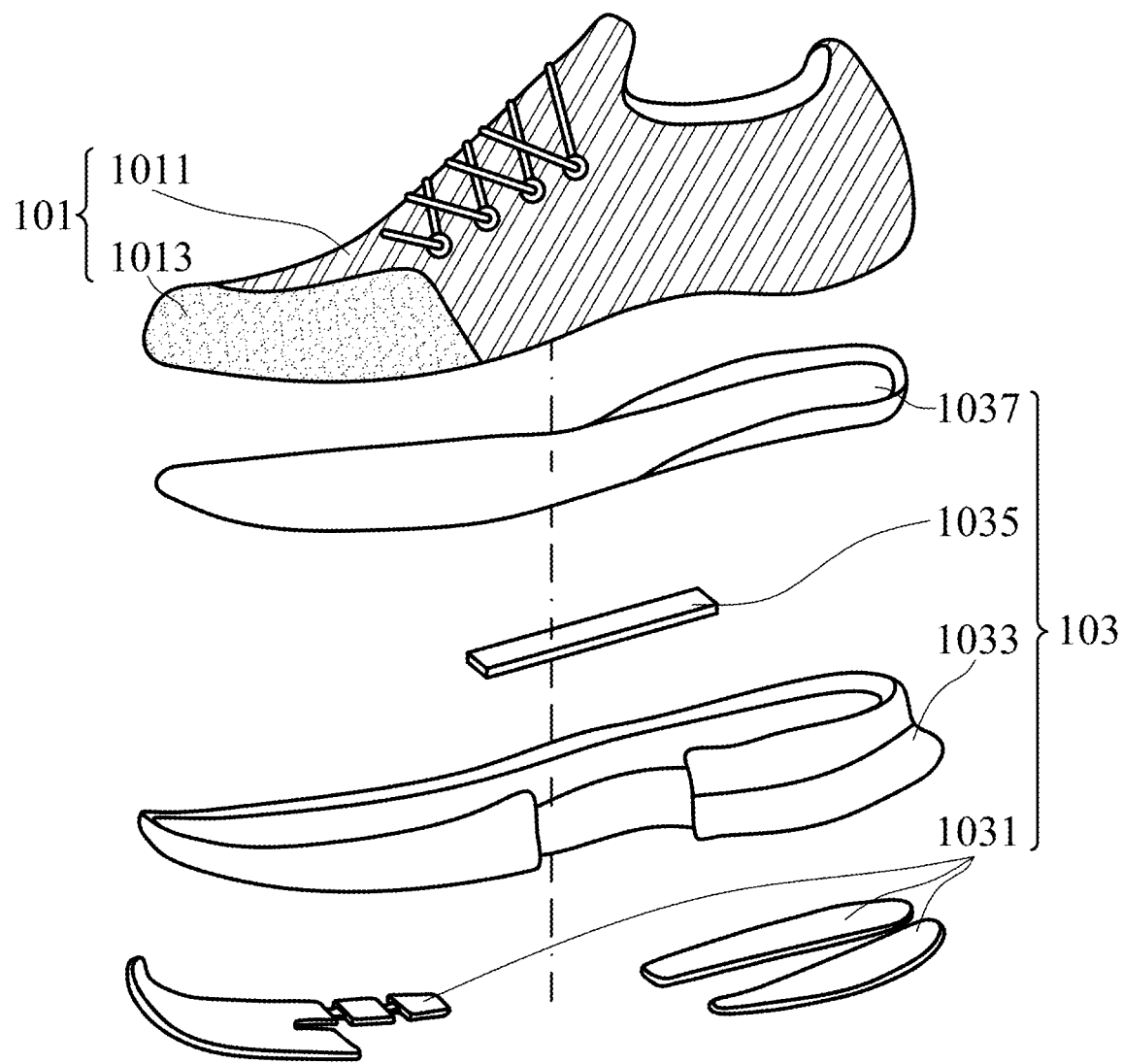

SPORTS SHOE

CROSS REFERENCE TO RELATED APPLICATIONS

This application claims the benefit of U.S. Provisional Application No. 63/400,129, filed on Aug. 23, 2022, and claims priority of Taiwan Patent Application No. 112126852, filed on Jul. 19, 2023, the entirety of which is incorporated by reference herein.

DISCLOSURE TECHNICAL FIELD

Disclosure

The present disclosure relates to sports shoe, and, in particular, to sports shoe made of thermoplastic material.

BACKGROUND

Traditional sports shoes include a shoe vamp, a shoe sole, and an adhesive component that bonds the shoe vamp and the shoe sole together. A traditional shoe vamp may include leather, leatherette, textiles, or a combination thereof. A traditional shoe sole includes a midsole and an outsole, wherein the midsole may include ethylene/vinyl acetate copolymer (EVA) and the outsole may include rubber, polyvinyl chloride (PVC), polyurethane (PU), or a combination thereof.

Materials included in the shoe vamp, midsole, and outsole of traditional sports shoes are different. Therefore, the traditional treatment of waste sports shoes needs to include a separation process for separating the shoe vamp, midsole, and outsole of waste sports shoes before the crushing process, recycling process, or incineration process. The aforementioned traditional treatment of waste sports shoes has the disadvantages of complicated procedures, poor recycling efficiency, and not being environmentally friendly.

SUMMARY

The present disclosure provides a sports shoe that may be recycled without separating the parts of the waste sports shoe. The waste sports shoe may be recycled to generate a recycled material, and the recycled material may be used to manufacture a sports shoe.

An embodiment of the present disclosure provides a sports shoe. The sports shoe includes a shoe vamp and a shoe sole connected to the shoe vamp. The shoe vamp includes a textile component, wherein the textile component includes thermoplastic polyester fibers. The shoe sole includes a shoe outsole and a shoe midsole foam disposed between the shoe outsole and the shoe vamp. The shoe outsole includes a vulcanizate and the shoe midsole foam includes a first thermoplastic elastomer. The vulcanizate includes rubber particles, a second thermoplastic elastomer, and an interface-compatible resin, wherein the content of the rubber particles is greater than the content of the second thermoplastic elastomer. The rubber particles are dispersed in the second thermoplastic elastomer in a form of spherical particles with particle sizes of about 0.5-10 µm.

BRIEF DESCRIPTION OF THE DRAWINGS

The present disclosure will be described more clearly with reference to the drawing in which there is shown illustrative embodiments of the disclosure, wherein:

FIG. 1 is an exploded view of a sports shoe according to an embodiment of the present disclosure.

DETAILED DESCRIPTION

The term "about" as used in the present disclosure refers to a value that is inclusive of the stated value and within an acceptable range of deviation when a person of ordinary skills in the art takes into account measurement issues and measurement errors (that is, limitations of the measurement system). For example, the term "about" may mean a value that is within one or more standard deviations of the stated value, or within ±30%, 20%, 10%, or 5% of the stated value. The values given here are approximate value. That is, the terms "about", "approximately", and "substantially" may still be implied if there is no specific description of "about", "approximately", and "substantially". In the present disclosure, the description "a-b" means that a value greater than or equal to a and a value less than or equal to b are included.

It may be understood that although the terms "first", "second", "third", and the like may be used herein to describe various components, compositions, regions, layers, and/or sections, these components, compositions, regions, layers, and/or sections should not be limited by these terms, and these terms are only used to distinguish different components, compositions, regions, layers, and/or sections. Thus, a first component, composition, region, layer, and/or section discussed below could be termed a second component, composition, region, layer, or section without departing from the teachings of some embodiments of the present disclosure.

In some embodiments of the present disclosure, the relative terms such as "lower", "upper", "horizontal", "vertical", "under", "above", "top", "bottom", and the like shall be understood as the orientation shown in related paragraphs and related drawings. Those relative terms are used for convenience of description only, and do not mean that the described device must be manufactured or operated in the specific orientation. It will be appreciated that if the device in the drawings is turned over so that it is upside down, components described as being on the "lower" side will then be oriented on the "upper" side. The embodiments of the present disclosure may be understood together with the drawings, and the drawings of the present disclosure are also regarded as a part of the specification. It should be understood that the drawings of the present disclosure are not drawn to scale and, in fact, the dimensions of components may be arbitrarily enlarged or reduced in order to clearly illustrate the features of the present disclosure.

Unless otherwise defined, all terms (including technical and scientific terms) used herein have the same meaning as commonly understood by a person of ordinary skills in the art. It is further understood that these terms, such as those defined in commonly used dictionaries, should be interpreted as having meanings consistent with the relevant art and the background or context of the present disclosure, and should not be interpreted in an idealized or overly formal manner, unless otherwise defined in the present disclosure.

The term "thermoplastic polyester elastomer (TPEE)" in the present disclosure refers to a block copolymer formed from a hard segment including polybutylene terephthalate (PBT) and a soft segment including polyether or polyester. Examples of the soft segment in the polyether-type polyester elastomer may include polytetramethylene ether glycol, polyethylene glycol ether, polypropylene glycol ether, but the present disclosure is not limited thereto. Examples of soft segment in the polyester-type polyester elastomer may include polyglycolide, polylactide, polycaprolactone, but the present disclosure is not limited thereto.

The present disclosure provides a sports shoe, the sports shoe includes a shoe vamp and a shoe sole connected to the shoe vamp. FIG. 1 is an exploded view of a sports shoe 10 according to an embodiment of the present disclosure. As shown in FIG. 1, the sports shoe 10 includes a shoe vamp 101 and a shoe sole 103 connected to the shoe vamp 101. The shoe vamp 101 and the shoe sole 103 of the present disclosure will be described below with reference to FIG. 1.

As shown in FIG. 1, the shoe sole 103 includes a shoe outsole 1031 and a shoe midsole foam 1033 disposed between the shoe outsole 1031 and the shoe vamp 101. The shoe midsole foam 1033 may provide functions such as cushioning, resilience and a high level of comfort. The shoe outsole 1031 has the advantages of high abrasion resistance and high wet slip resistance, and may efficiently convert the applied stress during walking into kinetic energy.

In some embodiments, the shoe midsole foam 1033 may have a specific gravity of about 0.1-0.4 g/cm$^2$, a resilience of about 50-70%, and a surface hardness of about 30-60 Shore C hardness. The shoe midsole foam 1033 includes a first thermoplastic elastomer. In some embodiments, the first thermoplastic elastomer may have an intrinsic viscosity (I.V.) of about 0.8-1.9 dL/g and a Shore A hardness of about 60-95.

In some embodiments, the first thermoplastic elastomer may include thermoplastic polyester elastomer (TPEE). In some embodiments, the first thermoplastic elastomer may include or consist of a first recycled thermoplastic elastomer. In some embodiments, the first recycled thermoplastic elastomer may be obtained from waste sports shoes, but the present disclosure is not limited thereto. In some embodiments, the first recycled thermoplastic elastomer may be prepared by performing chemical depolymerization and copolymerization processes on waste polyethylene terephthalate (r-PET), and the prepared first recycled thermoplastic elastomer may have an intrinsic viscosity of about 0.8-1.9 dL/g and a Shore A hardness of about 45-95. In some embodiments, the first recycled thermoplastic elastomer may have a Shore A hardness of about 60-95.

In some embodiments, the shoe midsole foam 1033 is formed by subjecting the first thermoplastic elastomer to an injection foaming process, a chemical extrusion foaming process, a molded foaming process, an immersion foaming process, or any combination of the foregoing processes. Specifically, in some embodiments, the manufacturing process of the shoe midsole foam 1033 includes the steps of preparing the first mixture, preparing the first particles, and foaming the first particles. In some embodiments, the first mixture may include a first thermoplastic elastomer, a cell nucleating agent, a cell stabilizer, and other additives. In some embodiments, other additives may include flow aids and/or antioxidants, but the present disclosure is not limited thereto. In some embodiments, the first particles may be obtained by subjecting the first mixture to a kneading process and a pelletizing process. The shoe midsole foam 1033 may be formed by subjecting the first particles to a chemical foaming process or a physical foaming process. The chemical foaming process or physical foaming process may include injection foaming process, chemical extrusion foaming process, molding foaming process, immersion foaming process, other suitable foaming processes, or any combination of the aforementioned processes.

In some embodiments, the shoe outsole 1031 has an abrasion resistance of about 50-250 mm$^3$ and a wet slip resistance coefficient of about 0.2-0.45. In some embodiments, the shoe outsole 1031 includes a vulcanizate. The shoe outsole 1031 is made of the vulcanizate by injection molding process, extrusion molding process, thermocompression molding process, or any combination of the aforementioned processes.

The vulcanizate may include rubber particles, a second thermoplastic elastomer, and an interface-compatible resin, but the present disclosure is not limited thereto. In some embodiments, the content of the rubber particles is greater than the content of the second thermoplastic elastomer, and the rubber particles are dispersed in the second thermoplastic elastomer in the form of spherical particles with a particle size of about 0.5-10 µm. In some embodiments, the rubber particles are dispersed in the second thermoplastic elastomer in the form of spherical particles with a particle size of about 0.5-5 µm. In some embodiments, the vulcanizate may include about 100 parts by weight of rubber particles, about 40-90 parts by weight of the second thermoplastic elastomer, and about 5-15 parts by weight of the interface-compatible resin (that is, based on 100 parts by weight of the rubber (particles), there are about 40-90 parts by weight of the second thermoplastic elastomer and about 5-15 parts by weight of the interface-compatible resin). In some embodiments, the vulcanizate may include 100 parts by weight of the rubber particles, about 50-80 parts by weight of the second thermoplastic elastomer, and about 8-12 parts by weight of the interface-compatible resin (that is, based on 100 parts by weight of the rubber (particles), there are about 50-80 parts by weight of the second thermoplastic elastomer and about 8-12 parts by weight of the interface-compatible resin).

In some embodiments, the second thermoplastic elastomer may have a Shore A hardness of about 45-70 and the intrinsic viscosity of about 0.8-1.9 dL/g. In some embodiments, the second thermoplastic elastomer may include thermoplastic polyester elastomer (TPEE). In some embodiments, the second thermoplastic elastomer includes a second recycled thermoplastic elastomer. In some embodiments, the second recycled thermoplastic elastomer may be obtained from waste sports shoes or other thermoplastic waste.

In some embodiments, the rubber particles may be obtained by subjecting the second mixture to a kneading process, a mixing process, and a pelletizing process after preparing the second mixture. The second mixture may include a styrene copolymer rubber, a crosslinking agent, and a crosslinking aid, but the present disclosure is not limited thereto.

The crosslinking agent may include any one of or any combinations of 2,5-bis(tert-butylperoxy)-2,5-dimethylhexane, dicumyl peroxide (DCP), benzoyl peroxide, and di-tert-butyl peroxide, but the present disclosure is not limited thereto.

The crosslinking aid may include any one of or any combinations of trimethylolpropane trimethacrylate (TMPTMA), triallyl isocyanurate (TAIL), trimethylolpropane triacrylate (TMPTA), triallyl cyanurate (TAC), triallylphosphate (TAP), and triallyl borate (TAB), but the present disclosure is not limited thereto.

The styrene copolymer rubber may be any copolymer including a styrene group. In some embodiments, the styrene copolymer rubber may include a cross-linked styrene copolymer having high anti-slip properties. In some embodiments, the styrene copolymer rubber may include any one of or any combinations of solution polymerized styrene-butadiene rubber (SSBR), emulsion polymerized styrene-butadiene rubber (ESBR), styrene-ethylene-butylene-styrene (SEBS) rubber, styrene-ethylene-propylene-styrene (SEPS)

rubber, styrene-butadiene (SB) rubber, styrene-isoprene-styrene (SIS) rubber, and styrene-butadiene-styrene (SBS) rubber, but the present disclosure is not limited thereto.

In some embodiments, the second mixture may further include a non-aromatic rubber. The non-aromatic rubber is rubber which does not include aromatic groups. In some embodiments, the non-aromatic rubber may include any one of or any combinations of butadiene rubber (BR), butyl rubber (IIR), brominated butyl rubber (BIIR), and natural rubber (NR), but the present disclosure is not limited thereto. The non-aromatic rubber may further improve properties including abrasion resistance, weather resistance, and compression resistance. In some embodiments, the second mixture may include about 100-80 parts by weight of the styrene copolymer rubber and about 0-20 parts by weight of the non-aromatic rubber (that is, the weight ratio of the styrene copolymer rubber:the non-aromatic rubber is 10-8: 0-2). In some embodiments, the second mixture may further include other additives. Other additives may include any one of or any combinations of reinforcing additives, antioxidants, plasticizers, and silane coupling agents, but the present disclosure is not limited thereto.

The interface-compatible resin may include any resin that may make rubber particles compatible with the interface-compatible resin. In some embodiments, the interface-compatible resin may include maleic anhydride grafted polymer, but the present disclosure is not limited thereto.

Examples of maleic anhydride grafted polymers may include maleic anhydride grafted polyethylene (PE-MAH), maleic anhydride grafted ethylene-vinyl acetate copolymer (EVA-MAH), maleic anhydride grafted polyolefin elastomer (POE-MAH), maleic anhydride grafted ethylene propylene diene monomer rubber (EPDM-MAH), maleic anhydride grafted styrene-ethylene-butylene-styrene rubber (SEBS-MAH), and styrene maleic anhydride (SMA), but the present disclosure is not limited thereto.

In some embodiments, the grafting ratio of the maleic anhydride grafted polymer is about 0.3-2.0%. When the grafting ratio of the maleic anhydride grafted polymer is lower than about 0.3%, the second thermoplastic elastomer may not be able to carry out the complete grafting reaction, and the compatibility of the second thermoplastic elastomer and the rubber particles may not be improve. When the grafting ratio of the maleic anhydride grafted polymer is higher than about 2.0%, the rubber particles may be excessively compatible with the second thermoplastic elastomer, affecting the phase inversion behavior of the subsequent dynamically vulcanized process.

In some embodiments, the shoe outsole 1031 may be connected to the shoe midsole foam 1033 by the polyester hot-melt adhesive, but the present disclosure is not limited thereto. In some embodiments, the shoe outsole 1031 may be injected on the shoe midsole foam 1033 by the injection molding process, and directly connected to the shoe midsole foam 1033 by the high temperature during the injection process without using other adhesives.

In some embodiments, the shoe sole 103 may further include a reinforcing balance sheet 1035 disposed between the shoe vamp 101 and the shoe midsole foam 1033. The reinforcing balance sheet 1035 may strengthen the anti-bending strength of the shoe sole 103 and improve the comfort of the arch of the foot while wearing the sports shoe. The reinforcing balance sheet 1035 may include a third thermoplastic elastomer. In some embodiments, the third thermoplastic elastomer may have an intrinsic viscosity of about 0.8-1.5 dL/g and a Shore D hardness of about 40-60. In some embodiments, the third thermoplastic elastomer may include thermoplastic polyester elastomer (TPEE). In some embodiments, the third thermoplastic elastomer may be obtained from waste sports shoes or other thermoplastic waste. In some embodiments, the reinforcing balance sheet 1035 may be formed by using the third thermoplastic elastomer by an injection molding process, an extrusion molding process, a thermocompression molding process, or any combination of the aforementioned processes.

In some embodiments, the shoe sole 103 may further include a shoe insole 1037 disposed between the reinforcing balance sheet 1035 and the shoe vamp 101. The shoe insole 1037 may be a foam with high softness to improve comfort. In some embodiments, the shoe insole 1037 may include thermoplastic polyester elastomer (TPEE). In some embodiments, the shoe insole 1037 may include recycled material obtained from waste sports shoes or other thermoplastic waste.

The shoe vamp 101 includes a textile component 1011, and the textile component 1011 may include thermoplastic polyester fibers. In some embodiments, the thermoplastic polyester fibers may be recycled thermoplastic polyester fibers obtained from waste sports shoes or other thermoplastic waste. In some embodiments, the thermoplastic polyester fiber may be about 50-150 denier and have an intrinsic viscosity of about 0.4-0.8 dL/g. The textile component 1011 may be a woven part, a knitted part, a non-woven part, a textile part, or any combination thereof formed by thermoplastic polyester fibers, but the present disclosure is not limited thereto. In some embodiments, the textile component 1011 may further include a fourth thermoplastic elastomer. In some embodiments, the fourth thermoplastic elastomer may be about 50-150 denier and have a Shore D hardness of about 50-90. In some embodiments, the fourth thermoplastic elastomer may include thermoplastic polyester elastomer (TPEE). In some embodiments, the weight ratio of the fourth thermoplastic elastomer to the thermoplastic polyester fiber is 1:4 to 3:2. In some embodiments, the fourth thermoplastic elastomer may be obtained from waste sports shoes or other thermoplastic waste. The textile component 1011 may be a woven part, a knitted part, a non-woven part, a textile part, or any combination thereof formed by thermoplastic polyester fibers and the fourth thermoplastic elastomer.

The shoe vamp 101 may further include a reinforcing component 1013 disposed on the edge of the textile component 1011, and the reinforcing component 1013 may improve the overall strength of the shoe vamp 101 and reduce the possibility of the shoe vamp 101 being damaged. In some embodiments, the reinforcing component 1013 may include a fifth thermoplastic elastomer. The fifth thermoplastic elastomer may have an intrinsic viscosity of about 0.8-1.5 dL/g and a Shore A hardness of about 80-95 or a Shore D hardness of about 40-60. In some embodiments, the fifth thermoplastic elastomer may include thermoplastic polyester elastomer (TPEE). In some embodiments, the fifth thermoplastic elastomer may be obtained from waste sports shoes or other thermoplastic waste.

The shoe vamp 101 and the shoe sole 103 may be manufactured separately. In some embodiments, the shoe vamp 101 and the shoe sole 103 may be connected by a polyester hot-melt adhesive, but the present disclosure is not limited thereto. In some embodiments, the shoe vamp 101 and the shoe sole 103 may be connected by bonding the shoe vamp 101 and the shoe sole 103 after melting the interface between the shoe vamp 101 and the shoe sole 103 through a heat joining process. Since each component of the sports shoe 10 includes polyester material, the sports shoe 10 of the present disclosure may be directly subjected to physical crushing in a recycling process without the need for separating process for separating the shoe elements in advance.

The advantages of the present disclosure are illustrated below by providing some embodiments.

Example 1

1. Preparation of the Shoe Vamp

The polyethylene terephthalate fibers or regenerated polyethylene terephthalate fibers (purchased from Nan Ya plastics corporation) and thermoplastic polyester elastomer fibers with a fiber specification of about 50-150 denier and a Shore D hardness of about 60-80 (purchased from RI-THAI international Inc.) are subjected to perform the weaving process to make the textile components.

The thermoplastic polyester elastomer (purchased from DuPont) with an intrinsic viscosity of about 0.8-1.5 dL/g and a Shore A hardness of about 80-95 or a Shore D hardness of about 40-60 is extrusion molded into a film (sheet) to obtain the reinforcing component. The reinforcing component is connected to the edge of the aforementioned textile component in a heat compression bonding process to complete the preparation of the shoe vamp.

2. Preparation of the Shoe Sole

The thermoplastic polyester elastomer particles (purchased from DSM company) with a hardness range of about 60-95 Shore A hardness and an intrinsic viscosity of about 0.8-1.9 dL/g are pre-dried at about 60-80° C. for about 3-4 hours. About 0.5 parts by weight of the antioxidant formula (respectively 0.25 parts by weight of the hindered phenolic antioxidant AO1010 and the phosphite ester antioxidant A168), about 0.5 parts by weight of the cell nucleating agent formula (the nano calcium carbonate), about 2.0 parts by weight of the cell stabilizer formula (the multifunctional chain extender ADR-4370), about 1.0 parts by weight of the flow aid formula (the stearate), and about 100 parts by weight of the dried thermoplastic polyester elastomer particles are mixed to obtain a shoe midsole mixture. The shoe midsole mixture is fed into the twin-screw extruder (25ψ, L/D=45) in the form of loss-in-weight feeding for kneading (the screw temperature is about 170-200° C., the rotation speed is about 150-300 rpm). The kneaded midsole mixture is subjected to the pelletizing process to obtain midsole particles. The midsole particles are dried at about 80-100° C. for about 6-8 hours. Finally, the midsole particles are subjected by a chemical foaming process or a physical foaming process to obtain the shoe midsole foam.

About 100 parts by weight of the solution polymerized styrene-butadiene rubber (SSBR, purchased from TSRC corporation, model: TAIPOL 1453), about 0.45 parts by weight of dicumyl peroxide (DCP, used as the crosslinking agent, purchased from Go Yen development Co., Ltd., model: GY-DCP), about 2 parts by weight of methylolpropane trimethacrylate (TMPTMA, used as the crosslinking aid, purchased from Double Bond Chemical Co., Ltd., model: DOUBLEMER TMPTMA), about 1.45 parts by weight of the antioxidant (AO1050, purchased from An Fong development Co., Ltd.), about 15 parts by weight of the paraffin oil (purchased from Emperor chemical Co., Ltd., model: EP paraffin oil) and about 30 parts by weight of the white carbon black are added into an internal mixer to obtain a rubber mixture. The rubber mixture are mixing and forcibly pelletizing at a temperature of about 60-80° C. and a screw speed of about 50-100 rpm to obtain rubber particles with a particle size of about 2-3 mm. The thermoplastic polyester elastomer particles (purchased from DSM company, with a hardness range of about 45-70 Shore A hardness, and an intrinsic viscosity of about 0.8-1.9 dL/g) are pre-dried at about 80° C. for about 3-4 hours. About 75 parts by weight of the dried thermoplastic polyester elastomer particles, about 100 parts by weight of the rubber particles, and about 9.2 parts by weight of styrene maleic anhydride (SMA, used as the interface-compatible resin, purchased from Yuanhong Co., Ltd., model SMA1000) are fed into the twin-screw extruder (26 ψ, L/D=60) for dynamically vulcanized reaction (the screw temperature of about 170-200° C., the speed of about 150-300 rpm) to obtain (dynamic) vulcanizate, while the rubber particles are dispersed in the thermoplastic polyester elastomer in the form of spherical particles with a particle size of 0.5-10 μm. The vulcanizate is pelletized to obtain shoe outsole particles. The shoe outsole particles are dried at about 80-100° C. for about 6-8 hours and then the shoe outsole is formed by the injection molding process using the shoe outsole particles.

The (reinforcing) balance sheet is formed by the injection molding process using the thermoplastic polyester elastomer particles with a hardness range of about 40-60 Shore D hardness (purchased from DSM company). The (reinforcing) balance sheet is directly injected and hot-melted on the shoe midsole foam by the injection molding process.

The shoe midsole foam is connected to the shoe outsole by the polyester hot-melt adhesive, or the shoe outsole is directly injected and hot-melted on the shoe midsole foam by the injection process.

3. Preparation of the Sports Shoe and Performance Testing

The shoe vamp and the shoe sole are connected together by the polyester hot-melt adhesive, or the interface between the shoe vamp and the shoe sole is melted using the heat joining process, and then the shoe vamp and the shoe sole are connected.

TPE EL250 from DSM in Netherlands is used as the comparative example 1 and TPEE P30B from Toyo in Japan is used as the comparative example 2. The abrasion resistance of the shoe outsole of the embodiment (example) of the present disclosure and comparative examples 1 and 2 are tested under DIN 53516 test. The wet slip resistance of the shoe outsole of the embodiment of the present disclosure and comparative examples 1 and 2 are tested under ASTM F489 test. The hardness of the shoe outsoles of the embodiment of the present disclosure and comparative examples 1 and 2 are tested under ASTM D2240 test. The testing results are shown in Table 1 below.

TABLE 1

|  | Example | Comparative example 1 | Comparative example 2 |
| --- | --- | --- | --- |
| Hardness (Shore A) | 68 | 69 | 70 |
| Abrasion resistance (mm³) | 85 | 100 | 95 |
| Wet slip resistance coefficient | 0.40 | 0.22 | 0.20 |

The specific gravity of the shoe midsole foam is about 0.1-0.4 g/cm³ under the ASTM D297 test, the resilience is about 50-70%, and the surface hardness is about 30-60 Shore C hardness.

From the results in Table 1, it may be seen that the sports shoe disclosed in the present disclosure have well abrasion resistance and wet slip resistance performance. In addition, it may be seen from the testing results of the shoe midsole foam that the sports shoe disclosed in the present disclosure have the characteristics of high cushioning, high resilience, and high level of comfort. The sports shoe of the present disclosure may simultaneously maintain properties such as well abrasion resistance, wet slip resistance performance, high cushioning, high resilience, and/or high level of comfort when all elements are made of (prepared of) thermoplastic polyester materials and/or polyester elastomers.

In addition, since all elements of the sports shoe disclosed herein are made of thermoplastic polyester materials and/or polyester elastomers, the sports shoe disclosed herein may be directly recycled and reused without the need of separating process for separating the shoe elements in advance. After recycling, the sports shoe disclosed in the present disclosure may be directly melted and processed into various shoe elements, such as the shoe outsoles, the shoe midsoles, or the reinforcing balance sheets.

The features of the aforementioned embodiments are helpful for a person of ordinary skills in the art to understand the present disclosure. A person of ordinary skills in the art should appreciate that, the present disclosure may be used as a basis for designing or modifying other processes and structures for carrying out the same purposes and/or achieving the same advantages of the embodiments described above. A person of ordinary skills in the art should also realize that such equivalent constructions do not depart from the spirit and scope of the present disclosure, and that they may make various changes, substitutions, and alterations herein without departing from the spirit and scope of the present disclosure.

What is claimed is:

1. A sports shoe, comprising:
    a shoe vamp comprising a textile component, wherein the textile component comprises thermoplastic polyester fibers; and
    a shoe sole connected to the shoe vamp and comprising:
    a shoe outsole; and
    a shoe midsole foam comprising a first thermoplastic elastomer and disposed between the shoe outsole and the shoe vamp,
    wherein the shoe outsole comprises a vulcanizate comprising:
    rubber particles;
    a second thermoplastic elastomer; and
    a maleic anhydride grafted polymer,
    wherein a content of the rubber particles is greater than a content of the second thermoplastic elastomer in the vulcanizate and the rubber particles are dispersed in the second thermoplastic elastomer in a form of spherical particles with particle sizes of 0.5-10 μm,
    wherein the first thermoplastic elastomer and the second thermoplastic elastomer comprise thermoplastic polyester elastomers (TPEE).

2. The sports shoe as claimed in claim 1, wherein the vulcanizate comprises:
    100 parts by weight of the rubber particles;
    40-90 parts by weight of the second thermoplastic elastomer; and
    5-15 parts by weight of the maleic anhydride grafted polymer.

3. The sports shoe as claimed in claim 1, wherein the rubber particles comprise 100-80 parts by weight of styrene copolymer rubber and 0-20 parts by weight of non-aromatic rubber.

4. The sports shoe as claimed in claim 1, wherein the shoe outsole has an abrasion resistance of 50-250 $mm^3$.

5. The sports shoe as claimed in claim 1, wherein the shoe outsole has a wet slip resistance coefficient of 0.2-0.45.

6. The sports shoe as claimed in claim 1, wherein the shoe midsole foam has a specific gravity of 0.1-0.4 $g/cm^3$.

7. The sports shoe as claimed in claim 1, wherein the shoe midsole foam has a resilience of 50-70%.

8. The sports shoe as claimed in claim 1, wherein the shoe midsole foam has a surface hardness of 30-60 Shore C hardness.

9. The sports shoe as claimed in claim 1, wherein the shoe sole further comprises a reinforcing balance sheet disposed between the shoe vamp and the shoe midsole foam, and the reinforcing balance sheet comprises a third thermoplastic elastomer, and the third thermoplastic elastomer has an intrinsic viscosity of 0.8-1.5 dL/g.

10. The sports shoe as claimed in claim 9, wherein the third thermoplastic elastomer has a Shore D hardness of 40-60.

11. The sports shoe as claimed in claim 1, wherein the textile component further comprises a third thermoplastic elastomer, and the fourth third thermoplastic elastomer has a Shore D hardness of 50-90.

12. The sports shoe as claimed in claim 11, wherein a weight ratio of the third thermoplastic elastomer and the thermoplastic polyester fibers is 1:4-3:2.

13. The sports shoe as claimed in claim 1, wherein the shoe vamp further comprises a reinforcing component at an edge of the textile component, the reinforcing component comprises a third thermoplastic polyester elastomer, and the third thermoplastic polyester elastomer has an intrinsic viscosity of 0.8-1.5 dL/g and a Shore A hardness of 80-95 or a Shore D hardness of 40-60.

14. The sports shoe as claimed in claim 1, wherein the first thermoplastic elastomer has an intrinsic viscosity of 0.8-1.9 dL/g and a Shore A hardness of 45-95.

15. The sports shoe as claimed in claim 1, wherein the thermoplastic polyester fibers are 50-150 denier.

* * * * *